United States Patent [19]
Takagi

[11] Patent Number: 6,131,147
[45] Date of Patent: *Oct. 10, 2000

[54] LARGE CAPACITY STORAGE APPARATUS HAVING STORAGE CELLS, AN ACCESSOR, A CACHE MEMORY AND A DISC UPDATE SECTION TO SET A NUMBER OF FREQUENTLY ACCESSED STORAGE MEDIA

[75] Inventor: Shiro Takagi, Tokyo, Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/098,728

[22] Filed: Jun. 18, 1998

Related U.S. Application Data

[62] Division of application No. 08/900,452, Jul. 25, 1997, Pat. No. 5,933,853, which is a continuation of application No. 08/409,522, Mar. 24, 1995, abandoned.

[30] Foreign Application Priority Data

Aug. 31, 1994 [JP] Japan .................................. 6-207771

[51] Int. Cl.[7] ............................. G06F 12/12; G11B 17/22
[52] U.S. Cl. .......................... 711/159; 711/113; 711/114; 711/122; 711/133; 369/30; 369/34
[58] Field of Search .................................. 711/159, 112, 711/113, 114, 122, 133, 117, 136, 160; 369/30, 34

[56] References Cited

U.S. PATENT DOCUMENTS

| | | | |
|---|---|---|---|
| 5,121,483 | 6/1992 | Monahan et al. ......................... 710/40 |
| 5,197,055 | 3/1993 | Hartung et al. ............................ 369/34 |
| 5,239,650 | 8/1993 | Hartung et al. ............................. 710/8 |
| 5,287,459 | 2/1994 | Gniewek ................................... 369/34 |
| 5,313,617 | 5/1994 | Nakano et al. ..................... 395/500.45 |
| 5,325,523 | 6/1994 | Beglin et al. ............................ 707/200 |
| 5,355,475 | 10/1994 | Tanaka et al. .......................... 707/205 |
| 5,371,855 | 12/1994 | Idleman et al. ......................... 711/113 |
| 5,386,516 | 1/1995 | Monahan et al. ......................... 369/30 |
| 5,392,416 | 2/1995 | Doi et al. .................................. 711/3 |
| 5,459,848 | 10/1995 | Mase ...................................... 711/112 |
| 5,469,560 | 11/1995 | Beglin .................................... 711/202 |
| 5,495,457 | 2/1996 | Takagi ...................................... 369/30 |
| 5,539,895 | 7/1996 | Bishop et al. .......................... 711/138 |
| 5,546,315 | 8/1996 | Kleinschnitz ........................... 700/218 |
| 5,790,886 | 8/1998 | Allen ........................................ 710/5 |

FOREIGN PATENT DOCUMENTS 4-301282  10/1992  Japan .

*Primary Examiner*—Do Hyun Yoo
*Assistant Examiner*—Hong Kim
*Attorney, Agent, or Firm*—Pillsbury Madison & Sutro LLP

[57] ABSTRACT

Data is stored in a cache memory, a cache HDD, high frequently accessed optical discs, or low frequently accessed optical discs, and the data is transferred between the cache memory and the cache HDD under the control of a control device which predicts the access frequency of data on the basis of the access history, transfers modified data items and only data items frequently accessed and not allocated to a high frequently accessed optical disc from the cache memory to the cache HDD, and deletes the remaining, thereby improving the use efficiency of the cache HDD.

2 Claims, 20 Drawing Sheets

FIG. 6

| NO. OF OPTICAL DISCS | 11 |
| --- | --- |
| NO. OF EMPTY OPTICAL DISCS | 1 |
| NO. OF PHYSICAL BLOCKS PER OPTICAL DISC | 1 M |
| NO. OF CACHE HDD BLOCKS | 1 M |
| NO. OF CACHE MEMORY BLOCKS | 1 K |
| NO. OF OPTICAL DISC DRIVES | 4 |
| NO. OF HIGH FREQ. ACCESSED DISCS | 4 |

| LOGICAL BLOCK NO. | OPTICAL DISC NO. | PHYSICAL BLOCK NO. | ACCESS TIME 1 | ACCESS TIME 2 |
| --- | --- | --- | --- | --- |
| 1 | 1 | 1 | 00:00 | 00:00 |
| 2 | 1 | 2 | 00:00 | 00:00 |
| 1 M | 1 | 1 M | 00:00 | 00:00 |
| 1 M+1 | 2 | 1 | 00:00 | 00:00 |
| 10 M | 10 | 1 M | | 00:00 |

~32

| ROTATION TIME 1 | 0 0 : 0 0 |
|---|---|
| ROTATION TIME 2 | 0 0 : 0 0 |

~33

F I G. 8

| OPTICAL DISC NO. | PHYSICAL BLOCK NO. | PHYSICAL FLAG |
|---|---|---|
| 1 | 1 | USED |
| 1 | 2 | USED |
| ... | ... | ... |
| 1 | 1 M | USED |
| ... | ... | ... |
| 1 0 | 1 M | USED |
| 1 1 | 1 | EMPTY |
| ... | ... | ... |
| 1 1 | 1 M | EMPTY |

~34

F I G. 9

| CACHE MEMORY BLOCK NO. | BLOCK FLAG | LOGICAL BLOCK NO. |
|---|---|---|
| 1 | EMPTY | -1 |
| 2 | EMPTY | -1 |
| ... | ... | ... |
| 1 K | EMPTY | -1 |

| CACHE HDD BLOCK NO. | BLOCK FLAG | LOGICAL BLOCK NO. |
|---|---|---|
| 1 | EMPTY | -1 |
| 2 | EMPTY | -1 |
| ... | ... | ... |
| 1 M | EMPTY | -1 |

| OPTICAL DISC NO. | FREQUENCY | STORAGE CELL NO. |
|---|---|---|
| 1 | 11 | 1 |
| 2 | 10 | 2 |
| 3 | 9 | 3 |
| 4 | 8 | 4 |
| 5 | 7 | 5 |
| 6 | 6 | 6 |
| 7 | 5 | 7 |
| 8 | 4 | 8 |
| 9 | 3 | 9 |
| 10 | 2 | 10 |
| 11 | 1 | 11 |

F I G. 12

| OPTICAL DISC DRIVE NO. | OPTICAL DISC NO. |
|---|---|
| 1 | 1 |
| 2 | 2 |
| 3 | 3 |
| 4 | 4 |

F I G. 13

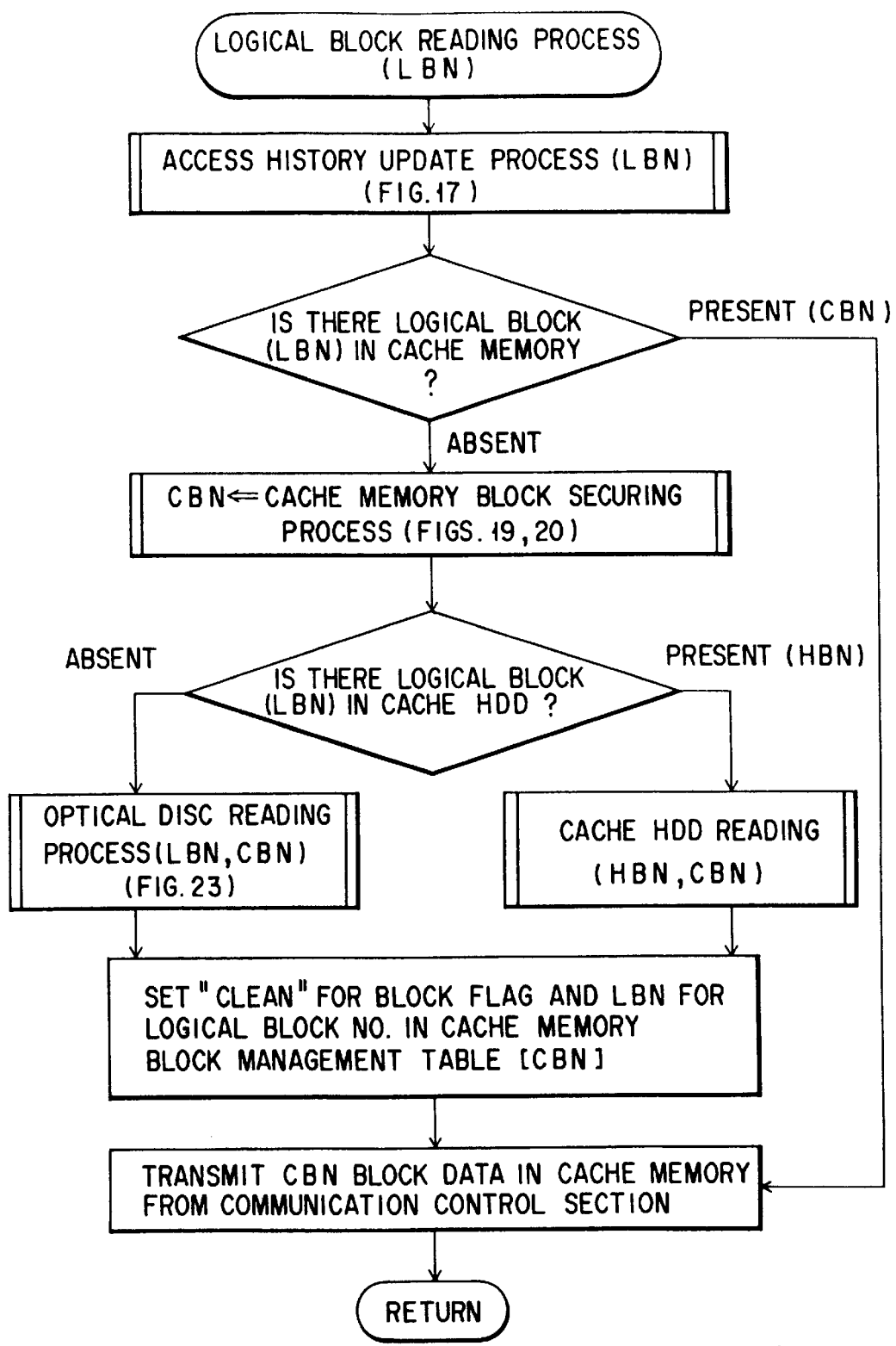
F I G. 15

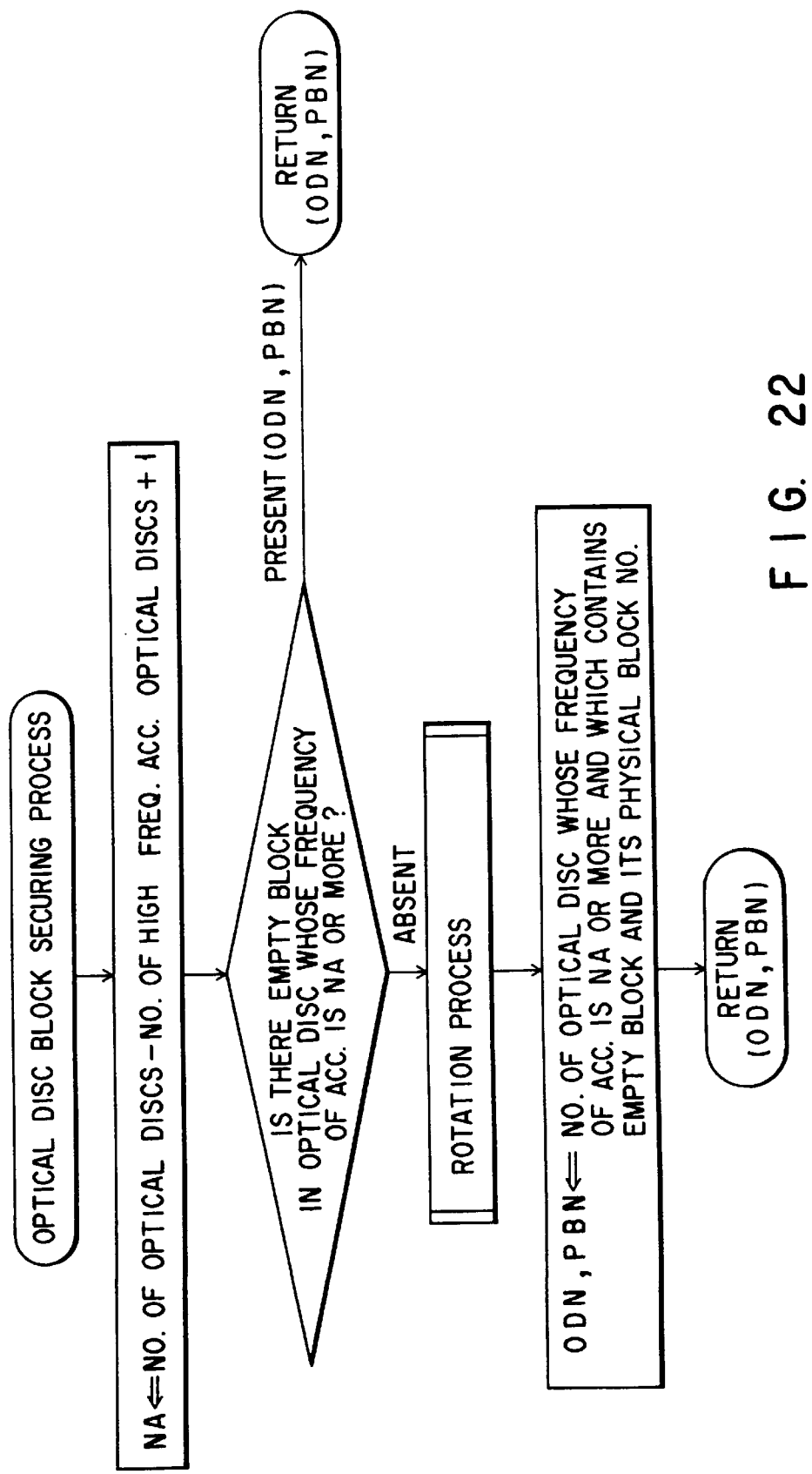
F I G. 22

LARGE CAPACITY STORAGE APPARATUS HAVING STORAGE CELLS, AN ACCESSOR, A CACHE MEMORY AND A DISC UPDATE SECTION TO SET A NUMBER OF FREQUENTLY ACCESSED STORAGE MEDIA

This is a division of application Ser. No. 08/900,452, filed Jul. 25, 1997, now U.S. Pat. No. 5,933,853, which is a continuation of application Ser. No. 08/409,522, filed Mar. 24, 1995, now abandoned.

BACKGROUND OF THE INVENTION

1. Field of the Invention

This invention relates to a large-capacity information storage apparatus which has removable storage media, such as optical discs, assembled for use and to an information processing method.

2. Description of the Related Art

Recently, the amount of data managed in offices has become enormous. To manage those large amounts of data, an autochanger is proposed in Unexamined Japanese Patent Application Publication No. 4-301282. The autochanger can hold a plurality of optical discs (e.g., rewritable opto-magnetic discs or CD-ROMs) serving as removable large-capacity information storage media. An autochanger also enables selective access, and has a control section which receives access from a workstation and reads data from a specified optical disc. The control section has the function of reading other data designated in other access information from the workstation into memory in advance, while the workstation is processing the read-out data. Because accessing the memory is done faster than access to the optical disc, use of a pre-reading function shortens the access time on the whole.

The transporting and loading of an optical disc to the optical disc drive and the removing of an optical disc from the disc drive, however, takes a very long time as compared with the data processing in the workstation or memory.

The pre-reading of the memory reading data can shorten the access time for reading data to some extent. In writing data, however, when the data processed at the workstation is to be written to an optical disc, the corresponding optical disk is going to be accessed.

To access an optical disc, a check is made to see whether or not the optical disc is loaded in an optical disc drive. If it is loaded, then the optical disc drive is accessed. If it is not loaded, the optical disk loaded in the optical disc drive is removed and returned to a storage cell. Then, the optical disc containing the data to be accessed is taken out of a storage cell and loaded in the optical disc drive. Thereafter, the optical disc drive is accessed.

The time required for the process is approximately ten seconds in the case of ordinary 5-inch optical disc drives, several hundred or several thousand times the processing time needed for accessing the memory. The main causes are the spin down process (the process of stopping the rotating motor in the optical disc drive) performed before the optical disc is removed from the optical disc drive, and the spin up process (the process of bringing the rotating motor to a specific number of revolutions in the optical disc drive) after the loading of the disc.

In the future, the amount of data managed in offices is expected to increase rapidly as a result of a wide spread use of multimedia data, such as moving picture data. In such a situation, the number of direct accesses to optical discs is considered to increase.

SUMMARY OF THE INVENTION

The object of the present invention is to provide a removable storage medium assembled-type large-capacity information storage apparatus constructed so as to reduce the number of accesses to removable storage media, thereby enabling high-speed data reading and writing, and an information processing method.

The forgoing object is accomplished by providing a data access apparatus comprising: keeping means for keeping a plurality of less frequently accessed optical storage media storing less frequently accessed data and highly frequently accessed optical storage media storing highly frequently accessed data; driving means for having one of the plurality of optical storage media loaded therein and writing and reading data into and from the loaded optical storage medium; first processing means for loading one of the optical storage media kept in the keeping means into one of the driving means or removing the storage medium loaded in the driving means and returning it to the keeping means; a cache memory for storing cache data for the optical storage media; a cache storage medium for storing modified data outputted from the cache memory or data having an access frequency larger than a specified value and not being stored in one of the highly frequently accessed optical storage media; and a number of highly frequently accessed disc update means for obtaining an amount of data actually frequently accessed from a data access history and for computing a number of highly frequently accessed optical storage media on the basis of an amount of data and for setting the number of the highly frequently accessed optical storage media at the number of media computed.

With the present invention, when data is written from the cache memory into a magnetic storage medium, the writing is affected after it is confirmed that the writing data is not stored in either the magnetic storage medium or any of the removable storage media, or that the writing data is accessed highly-frequency and is not stored in the highly-frequency accessed removable storage media. When the above-mentioned confirmation is not made, the data writing process is inhibited. Therefore, it is possible to provide a data access apparatus which improves the use efficiency of the magnetic storage medium and shortens the access time on the whole.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claim.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred, embodiment given below, serve to explain the principles of the invention.

FIG. 6 shows an example of data storage in a system management table;

FIG. 7 shows an example of data storage in a logical block management table;

FIG. 8 shows an example of data storage in a rotation history management table;

FIG. 9 shows an example of data storage in a physical block management table;

FIG. 10 shows an example of data storage in a cache memory block management table;

FIG. 11 shows an example of data storage in a cache HDD block management table;

FIG. 12 shows an example of data storage in an optical disc management table;

FIG. 13 shows an example of data storage in an optical disc drive management table;

FIG. 15 is a flowchart to explain the logical block reading process;

FIG. 22 is a flowchart to explain the optical disc block securing process;

DETAILED DESCRIPTION OF THE PREFERRED EMBODIMENT

Hereinafter, referring to the accompanying drawings, an embodiment of the present invention will be explained.

Figure 1:
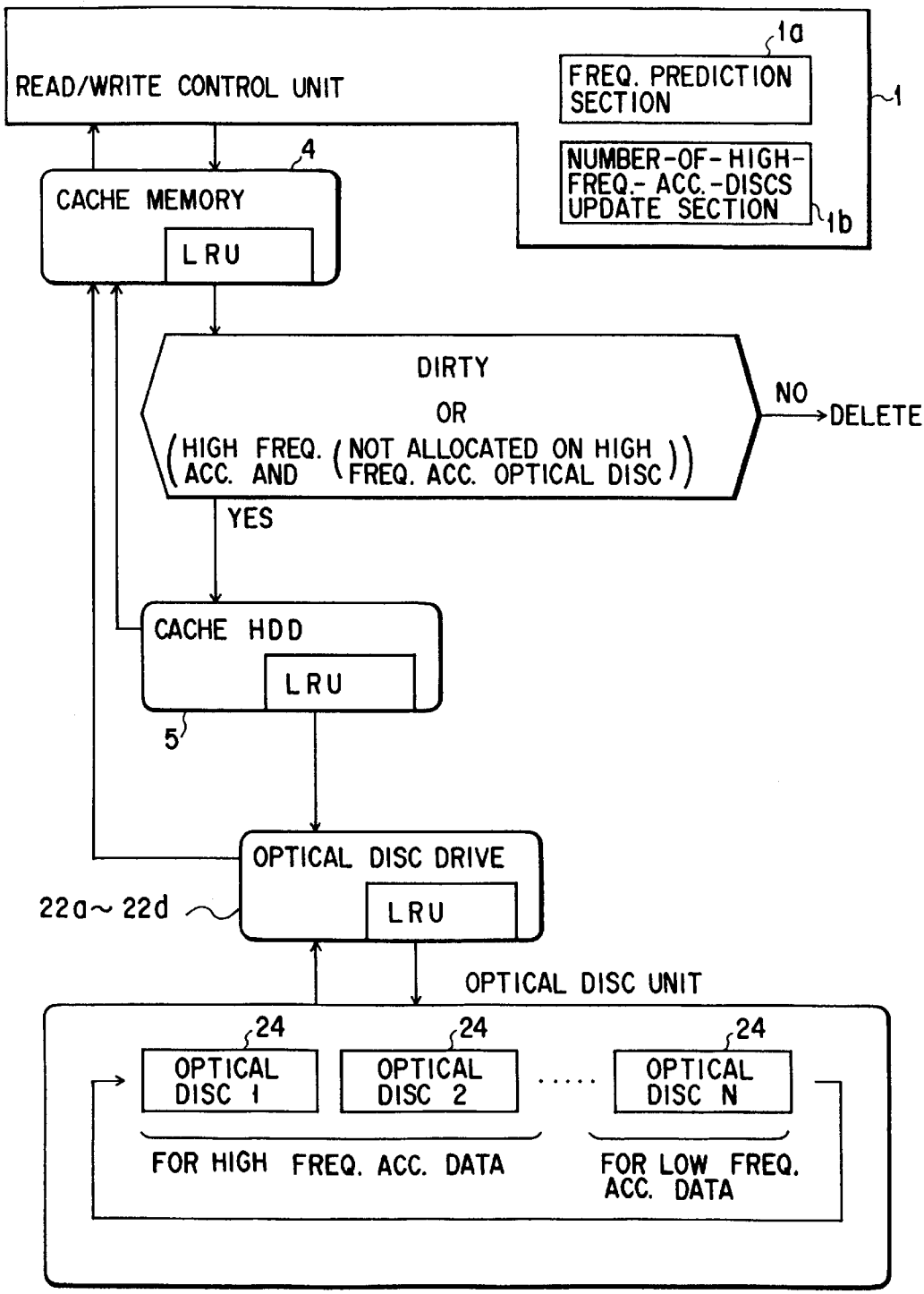
FIG. 1 shows a hierarchical storage model in an assembled-type optical disc apparatus according to one embodiment of the present invention.

FIG. 1 shows an outline of the data reading and writing process in an apparatus according to the embodiment. Before explanation of the process, the system configuration of an assembled-type optical disc apparatus according to the embodiment will be explained with reference to FIG. 2.

Figure 2:
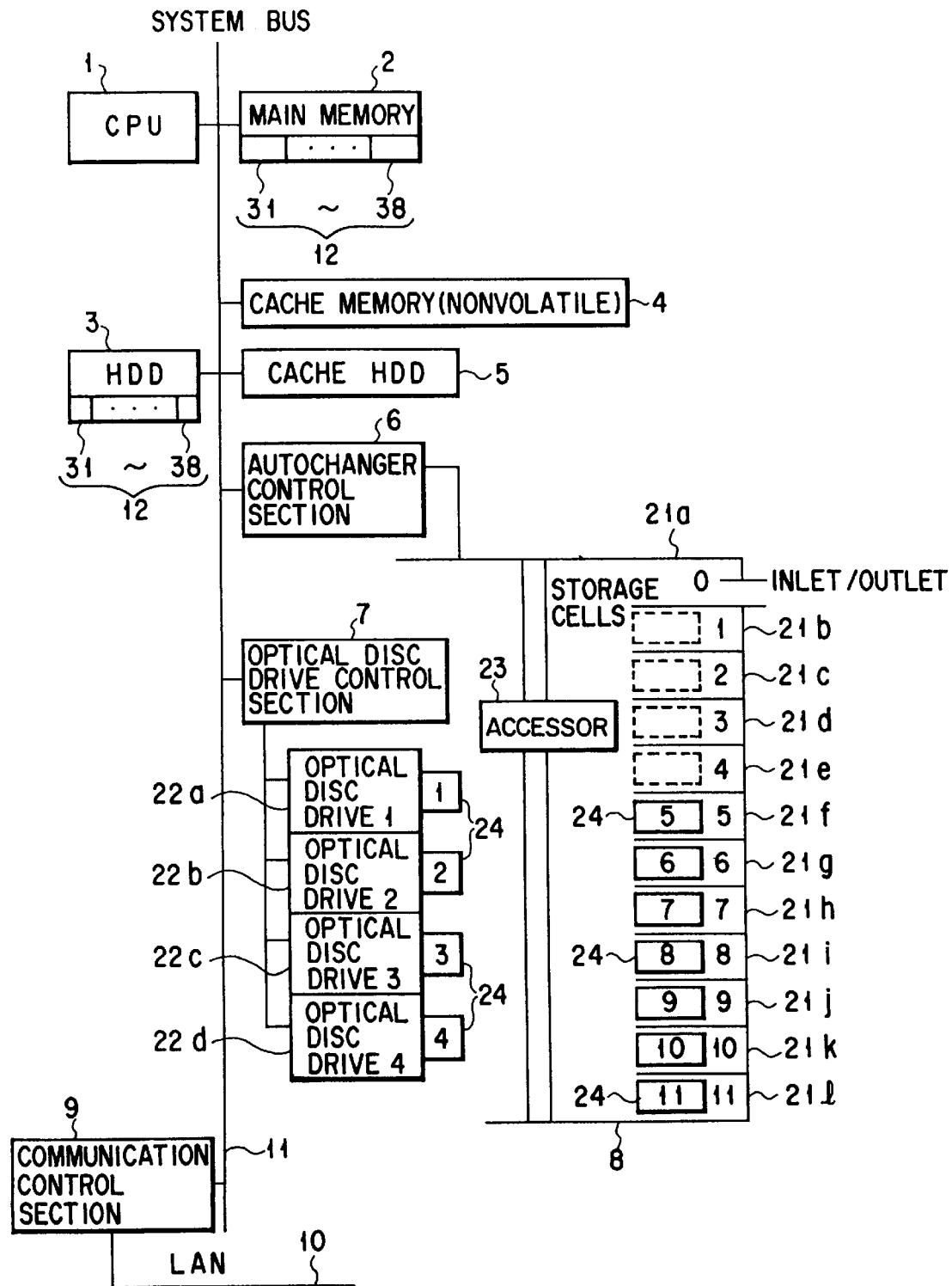
FIG. 2 is a block diagram of the entire structure of an assembled-type optical disc apparatus according to the embodiment of the present invention.

An optical disc apparatus shown in FIG. 2 comprises a CPU 1, a main memory 2, a HDD (hard disc drive) 3, a cache memory 4, a cache HDD 5, an autochanger control section 6, an optical disc drive control section 7, an autochanger 8, and a communication control section 9.

The HDD 3 and main memory 2 store programs and data. They also store management tables 12 explained later.

The CPU 1 controls the entire operation. The CPU reads the program stored in the HDD 3 into the main memory 2, and controls each section according to the contents of the main memory.

The autochanger 8 is composed of a plurality of storage cells 21a to 21l, and an accessor 23, and is controlled by the autochanger control section 6.

The storage cells 21a (21b to 21l) (keeping means) hold optical discs 24. The storage cells 21a to 21l are numbered from 0 to 11. The storage cell 21a with number 0 is a window of the autochanger 8 for taking in and out optical discs 24. Optical discs 24 can be held in the eleven storage cells 21b to 21l numbered from 1 to 11.

The optical disc drives 22a, through 22d (driving means) write data into and read data from the optical discs 24. The optical disc drive control section 7 controls four optical disc drives 22a, through 22d.

The accessor 23 (first processing means) moves the optical discs 24 between the storage cell 21 and the optical disc drives 22a through 22d.

The cache memory 4 is made up of a nonvolatile semiconductor memory and is the highest-level storage device in hierarchic storage.

The cache HDD 5 (a cache storage medium) is an HDD for storing the data read from the optical disc drives 22a through 22d and is a middle-level storage device in hierarchic storage.

The cache memory 4 and cache HDD 5 are managed by the LRU (Least Recently Used) system, for example.

An LRU algorithm is based on a hypothesis that "the recently accessed data will be accessed frequently from now on", and drives the least recently accessed data item when the cache is full.

The communication control section 9 is connected to a LAN 10, receives commands sent from an external unit through the LAN 10, and transmits the processing result.

These sections are connected to each other with a system bus 11.

The optical discs 24 are opto-magnetic discs, which can not only read data, but also add, delete and modify data.

All the data in the apparatus is managed in blocks each consisting of units of 1K bytes, where K is 1024. A single optical disc 24 contains 1M blocks (where M is 1024K) and has a capacity of 1G bytes (where G is 1024M). A total of eleven optical discs 24 are managed. Of them, an area for ten discs is used for data storage, and an area for the remaining one disc is reserved for an empty area. The entire apparatus can manage 10G bytes of data, which corresponds to a capacity for ten optical discs 24.

The cache memory 4 contains 1K blocks and has a capacity of 1M bytes (corresponding to 0.01% of the entire apparatus capacity). The cache HDD 5 contains 1M blocks and has a capacity of 1G bytes (corresponding to 10% of the entire apparatus capacity).

In the apparatus, logical block Nos. (from 1 to 10M) are given to 10M blocks (a capacity of 10G bytes) to be managed. For each logical block, a management table 12 manages the number of optical disc 24, its physical block number, and its access history. The physical block has an actual block number on the optical disc 24.

The access history indicates the past two access times to blocks and is used in selecting a logical block to be driven out of the cache memory 4 or cache HDD 5 in predicting the access frequency of a logical block. The commands sent through the LAN 10 are a request for reading and writing from and into logical blocks. In a reading process, data is loaded into the cache memory 4 and a response is given.

Hereinafter, an outline of the processes in the FIG. 2 apparatus will be given with reference to FIG. 1.

A CPU 1 serving as a read/write control unit is provided with a frequency prediction section 1a that predicts the access frequency of data items. The optical discs 24 are divided into a highly-frequency accessed group that stores highly-frequency accessed data items and a less-frequency accessed group that stores low-frequency accessed data items. By collecting highly-frequency accessed data items on the highly-frequency accessed optical discs 24, the number of changes of optical discs 24 can be reduced.

In staging out data from the cache memory 4 to the cache HDD 5, only when the data is dirty or high-frequency accessed and not stored in a highly-frequency accessed optical disc 24, it is written into the cache HDD 5. In other cases, writing is not effected and the data is just discarded. Here, data subjected to modifications is defined as dirty and data subjected to no modification in the CPU 1 is defined as clean.

When data is staged out from the cache HDD 5 to the optical disc 24, the data is always written into an empty area in the highly-frequency accessed optical disc 24, and a delete mark is put on the area in the original less-frequency accessed optical disc 24 from which the data is read out and the area is treated as empty.

When the high-frequency accessed optical discs 24 are running short of empty areas, the empty areas with delete marks are put together in the less-frequency accessed optical discs 24 to produce an optical disc 24 whose entire area is an empty area. Then, a rotation process is performed to turn the optical disk 24 into a new highly-frequency accessed optical disc 24.

By doing this, the cache HDD 5 stores dirty data items or only such data items as are newly turned into highly-frequency accessed data items and have not been allocated to a highly-frequency accessed optical disc 24. The data already allocated to a highly-frequency accessed optical disc 24 is not written into the cache HDD 5. When accessed, the data is read from a highly-frequency accessed optical discs 24 more likely to be loaded. This makes it possible to access as much highly-frequency accessed data as a sum of the capacity of the cache HDD 5 and an optical disc capacity of the optical disc drives accessed, without changing the optical discs 24. Thus, the number of changes of optical discs 24 can be reduced.

Figure 3:
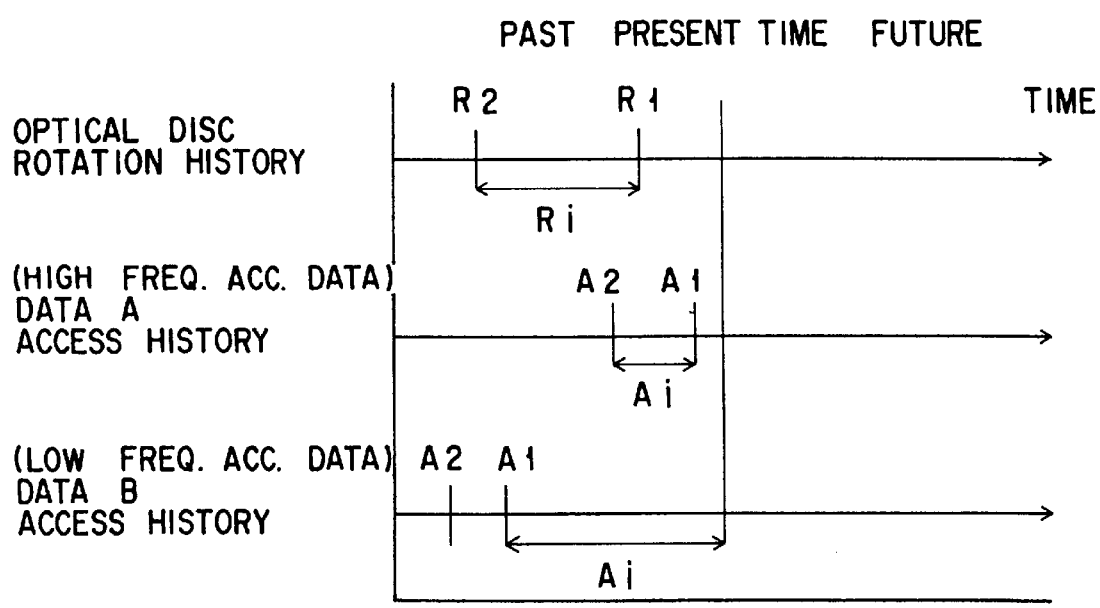
FIG. 3 is a diagram for explaining a frequency prediction process.

The frequency prediction section 1a, as shown in FIG. 1, predicts the access frequency of each data item on the basis of a history of times when the rotation process of the optical disc 24 was carried out and a history of access times to each data item. In FIG. 3, R1 and R2 indicate a first and second times when the latest rotation processes were performed respectively, and A1 and A2 indicate a first and second times when the latest data accesses were effected respectively. These give:

Rotation interval: $Ri = \max((R1-R2), \text{present time}-R1)$

Access interval: $Ai = \max((A1-A2), \text{present time}-A1)$

The value obtained by multiplying the rotation interval by the number of highly-frequency accessed optical discs can be considered to be a period of time when the highly-frequency accessed optical discs 24 remain loaded in the optical disc drives 22a through 22d. The access interval can be considered to be the time elapsed until data is accessed next time. When the access interval is within a value obtained by multiplying the rotation interval and the number of highly-frequency accessed discs, storing data on a presently highly-frequency accessed optical disc 24 provides a strong possibility that the data can be accessed without change of discs in the next access. Therefore, the data can be judged to be highly-frequency accessed data at the present time. Conversely, when the access interval is larger than the product value (the rotation interval*the number of highly-frequency accessed discs), there is a strong possibility that a subsequent access will not take place as long as the presently highly-frequency accessed optical disc 24 is loaded. Therefore, the data can be determined to be accessed with low-frequency. By comparing the data access interval with the rotation interval of optical disc 24 multiplied by the number of highly-frequency accessed discs, it can be determined whether the frequency of use of data is high or low as in the following expression:

if $Ai <= (Ri*\text{the number of highly-frequency accessed discs})$, then highly-frequency-accessed data, else less-frequency-accessed data.

The rotation process is the process of putting empty areas with delete marks together in the optical discs 24 to produce an empty optical disc 24 whose entire area is empty, and setting the empty optical disc 24 for a most-frequently accessed optical disc 24.

Figure 4:
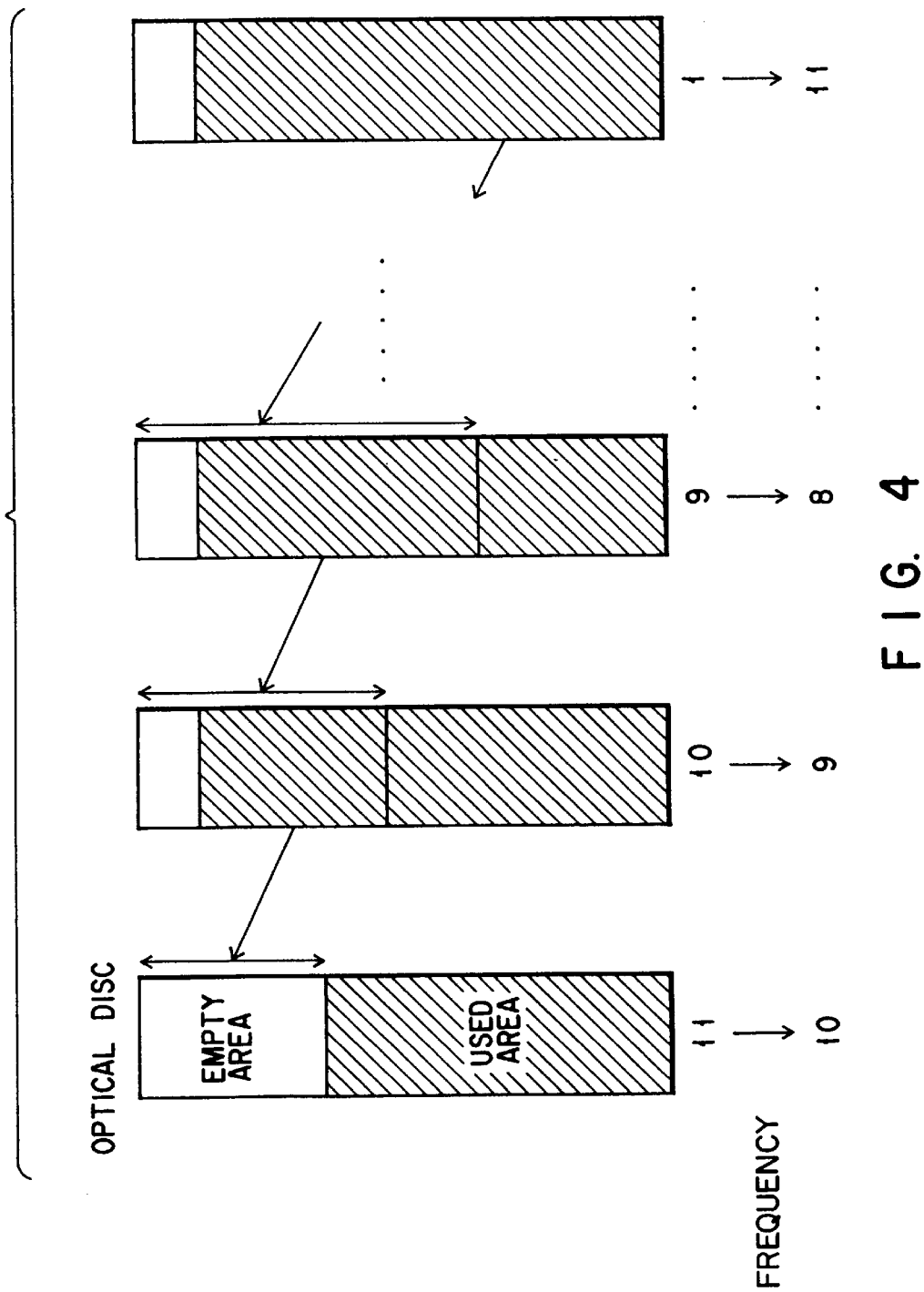
FIG. 4 shows an outline of a rotation process.

In FIG. 4, the process of moving the data in a highly-frequency accessed optical disc 24 to an empty area in a still highly-frequency accessed optical disc 24, is carried out, starting with the most frequently accessed optical disc 24 downward to high-frequency accessed optical discs 24 in descending order. This can produce an empty optical disc 24, while maintaining the order of frequency of use of data based on the access history. Thereafter, the empty optical disc 24 is set for the most frequently accessed optical disc 24.

Figure 5:
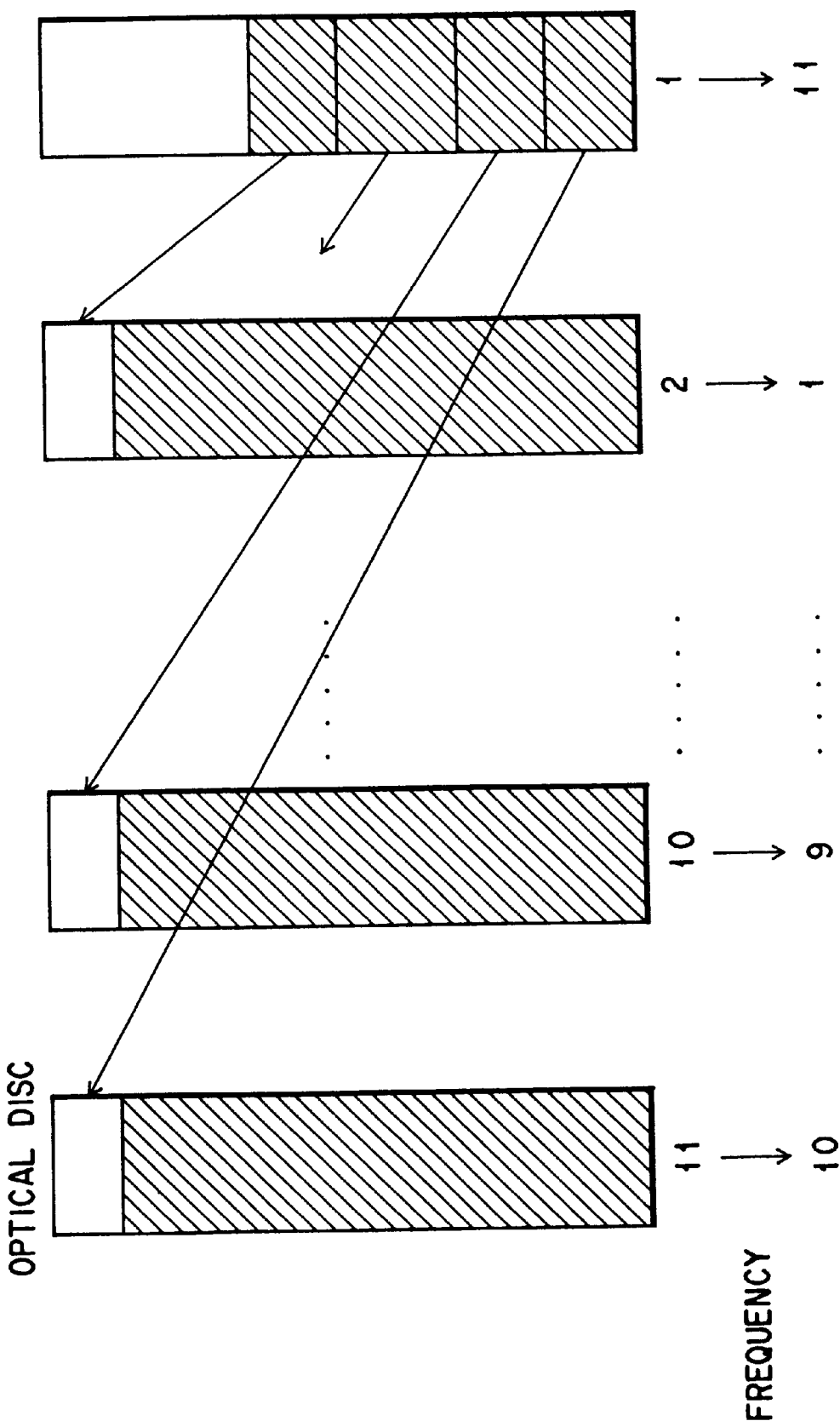
FIG. 5 shows another outline of a rotation process.

FIG. 5 shows another rotation process, which minimizes the amount of data moved as compared with the process of FIG. 4.

The number of highly-frequency accessed discs must be set at the number of as many optical discs as the logical blocks actually frequently accessed according to the change of access pattern.

When the number of highly-frequency accessed discs is smaller than the number of logical blocks actually frequently accessed, even the logical block data allocated to an optical disc 24 more likely to be loaded undergoes the stage out process of the cache HDD 5 and another optical disc 24, which increases the number of rotation processes, degrading the performance. Conversely, when the number of highly-frequency accessed discs is too large, even if the logical block is frequently accessed and not allocated to an optical disc 24 more likely to be loaded, it is not subjected to the stage-out process. That is, the optimum data allocation is not made between optical discs 24, and therefore each time a logical block is accessed, the change of optical discs 24 takes place, degrading the performance.

To avoid this drawback, the CPU 1 contains a number-of-highly-frequency-accessed-disc update section 1b, which looks up the access history of logical blocks, obtains the number of logical blocks accessed in a certain period of time, and updates the number of high-frequency accessed discs.

While in the aforementioned process, a delete mark is put on the area in the old optical disc 24 at the time of staging out data from the cache HDD 5 to an optical disc 24, a delete mark may be put at the time of staging out data from the cache memory 4 to the cache HDD 5. This makes it possible to secure an empty area on the optical disc 24 at the early stage, thereby increasing the possibility that highly-frequency accessed data exists in the cache HDD 5 or highly-frequency accessed optical disc 24.

FIGS. 6 to 13 show the management tables 12 accessed in the apparatus, or management tables 31 through 38 at the initial time.

FIG. 6 is a system management table 31 showing the system structure of the entire apparatus. "NUMBER OF OPTICAL DISCS" is the number of optical discs to be managed in the apparatus. Here, it is 11 and the individual discs are given optical disc Nos. 1 to 11, respectively.

"NUMBER OF PHYSICAL BLOCKS PER OPTICAL DISC" is the number of physical blocks in a single optical disc. Here, it is 1M, and the individual blocks are given physical block Nos. 1 to 1M. Since one block contains 1K bytes,—a capacity of a single optical disc is 1G bytes.

"NUMBER OF EMPTY OPTICAL DISCS" is the number of empty optical discs 24. Here, it is 1. The single empty optical disc is accessed for deleted blocks (empty blocks) caused at the time of writing high frequently accessed data items. The number of discs obtained by subtracting "NUMBER OF EMPTY OPTICAL DISCS" from "NUMBER OF OPTICAL DISCS" is the number of logical optical discs that manage logical blocks. Here, 11–1 gives 10 discs, and the number of logical blocks is 10M (10G bytes).

"NUMBER OF CACHE HDD BLOCKS" is the number of blocks in the cache HDD 5. Here, it is 1M, and the individual blocks are given cache HDD block Nos. 1 to 1M, respectively. The capacity is 1G bytes, corresponding to 10% of the total management capacity of the apparatus (10G bytes).

"NUMBER OF CACHE MEMORY BLOCKS" is the number of blocks in the cache memory 4. Here, it is 1K, and the individual blocks are given cache memory block Nos. 1 to 1K, respectively. The capacity is 1M bytes, corresponding to 0.01% of the total management capacity of the embodied apparatus (10G bytes).

"NUMBER OF OPTICAL DISC DRIVES" is the total number of the optical disc drive units 22a through 22d built in the autochanger 8. Here, it is 4, and the individual units are given-optical drive Nos. 1 to 4, respectively.

"NUMBER OF HIGH FREQUENTLY ACCESSED DISCS" is the number of optical discs that store logical blocks estimated to be high-frequency accessed blocks. Here, it is 4.

FIG. 7 is a logical block management table 32 that manages a total of 10M logical blocks. "OPTICAL DISC NO." and "PHYSICAL BLOCK NO." indicate an optical disc 24 in which the data in a logical block is actually stored and its physical block number. "ACCESS TIME 1" and "ACCESS TIME 2" are the time at which the logical block was accessed latest and the time at which the logical block was accessed earlier by an external unit, respectively.

Logical block data whose number is 1 is stored in physical block whose number is 1 on an optical disc 24 whose number is I. Because it has not been accessed yet at all, both ACCESS TIME 1 and ACCESS TIME 2 are 00:00.

FIG. 8 is a rotation history management table 33 that manages the history of the rotation process of the optical discs 24, and consists of two times at which the rotation process was performed in the past. Here, because the rotation has not been effected yet at all, 00:00 is set for the tires.

FIG. 9 is a physical block management table 34 that manages the physical blocks in eleven optical discs 24. The physical blocks are managed in sequence, starting at physical block whose number is 1 on an optical disc 24 whose number is 1. "PHYSICAL FLAG" indicates whether the corresponding physical block is allocated as a logical block (USED) and accessed (ACCESSED), or unallocated to a logical block and empty (EMPTY). In the initial state, all the physical blocks in the optical discs 24 whose optical disc numbers range from 1 to 10 are accessed, and all the physical blocks in the optical disc whose optical disc number is 11 are set empty.

FIG. 10 is a cache memory block management table 35 that manages 1K cache memory blocks stored in the cache memory 4. "BLOCK FLAG" indicates whether a cache memory block is un-accessed and empty (EMPTY), a logical block has been allocated without modifying the data (CLEAN), or a modification has been made to the data (DIRTY). In the case of clean or dirty, the number of the logical block to be allocated is stored in "LOGICAL BLOCK NO." Here, all of the cache memory blocks are empty.

FIG. 11 is a cache HDD block management table 36 that manages 1M cache HDD blocks stored in the cache HDD 5. "BLOCK FLAG" indicates whether the cache HDD block is un-accessed and empty (EMPTY), a logical block has been allocated without modifying the data (CLEAN), or a modification has been made to the data (DIRTY). In the case of clean or dirty, the number of the logical block to be allocated is stored in "LOGICAL BLOCK NO." Here, all of the cache HDD blocks are empty.

FIG. 12 is an optical disc management table 37 that manages all of the eleven optical discs 24 in the apparatus. "FREQUENCY" indicates how frequently the data stored in each optical disc 24 is accessed. The larger the value, the higher frequency the stored data is accessed. "STORAGE CELL NO." is the number of storage cell 21a in the autochanger 8. When optical discs 24 are removed from the optical disc drives 22a through 22d they are placed in storage cells 21a through 21l identified by STORAGE CELL NOS.

FIG. 13 is an optical disc drive management table 38 that manages four optical disc drives 22a through 22d "OPTICAL DISC NO." is the number of an optical disc 24 loaded in each optical disc drive 22a.

FIGS. 14 to 25 are flowcharts showing the processing procedure in the control section in the apparatus.

Figure 14:
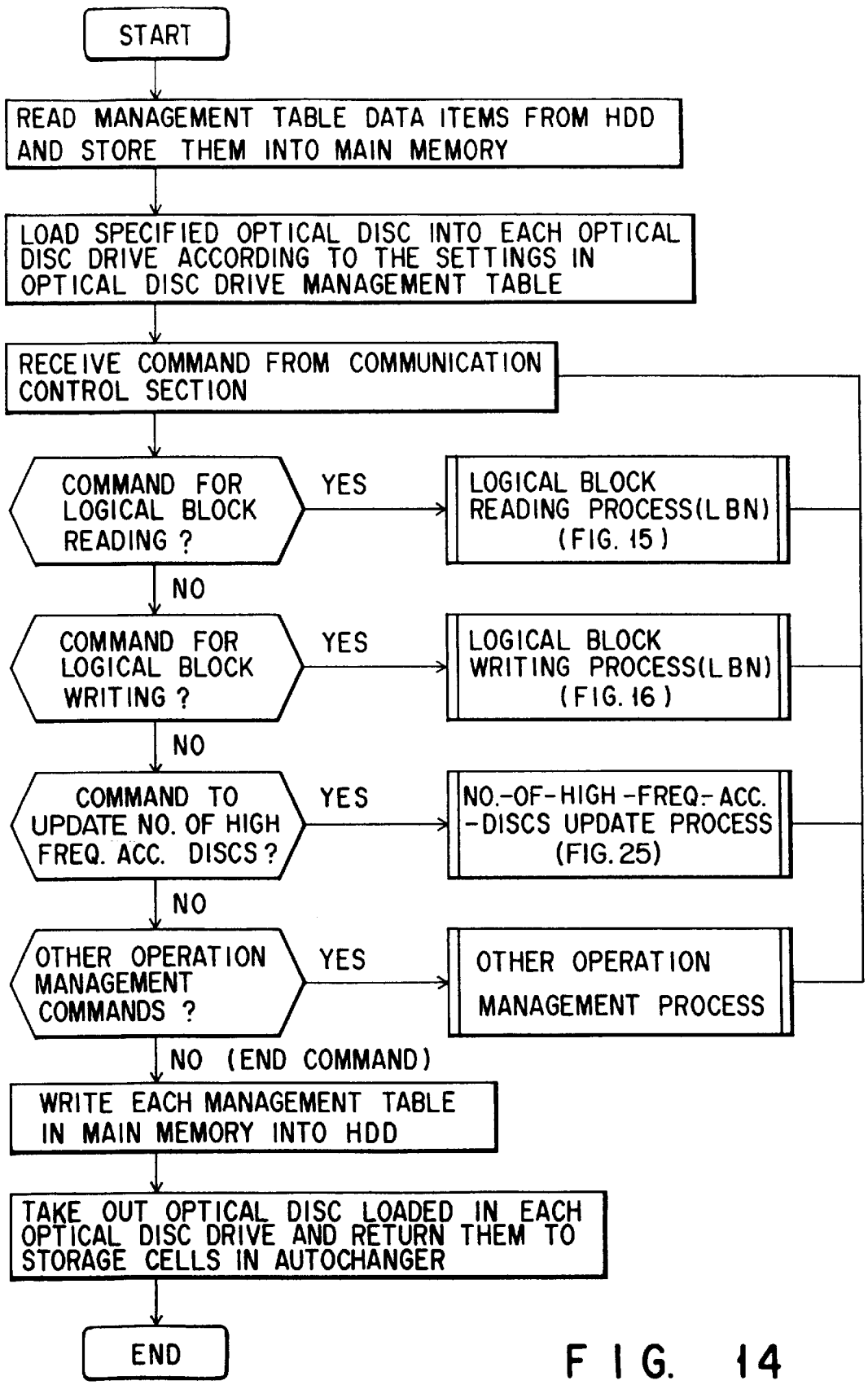
FIG. 14 is a flowchart to help explain the process in the optical disc apparatus.

FIG. 14 is a flowchart showing the entire process procedure in the apparatus.

First, the individual management tables 31 through 38 stored in the HDD 3 are read out and stored in the main memory 2.

According to the settings in the optical disc drive management table 38, specified optical discs 24 are loaded into the individual optical disc drives 22a through 22d.

Thereafter, a command transmitted from an external unit is received by the communication section 9 and the process according to each command is executed.

When the command is "LOGICAL BLOCK READING", a "LOGICAL BLOCK READING PROCESS" is performed where the logical block data specified by an external unit is read out and transmitted to the external unit (FIG. 15).

Figure 16:
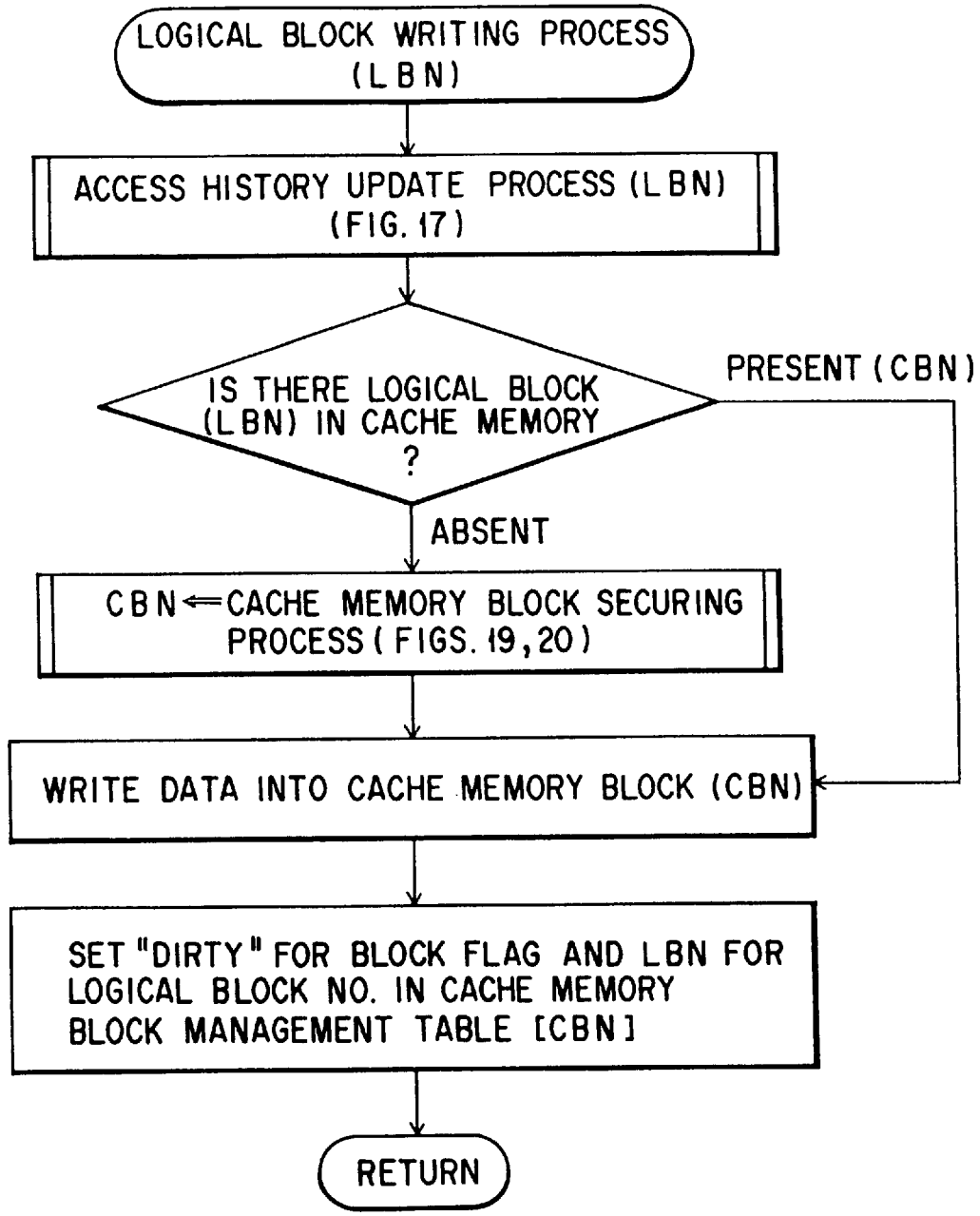
FIG. 16 is a flowchart to explain the logical block writing process.

When the command is "LOGICAL BLOCK WRITING" a "LOGICAL BLOCK WRITING PROCESS" is performed where the block data received from the external unit is written into the specified logical block (FIG. 16).

Figure 25:
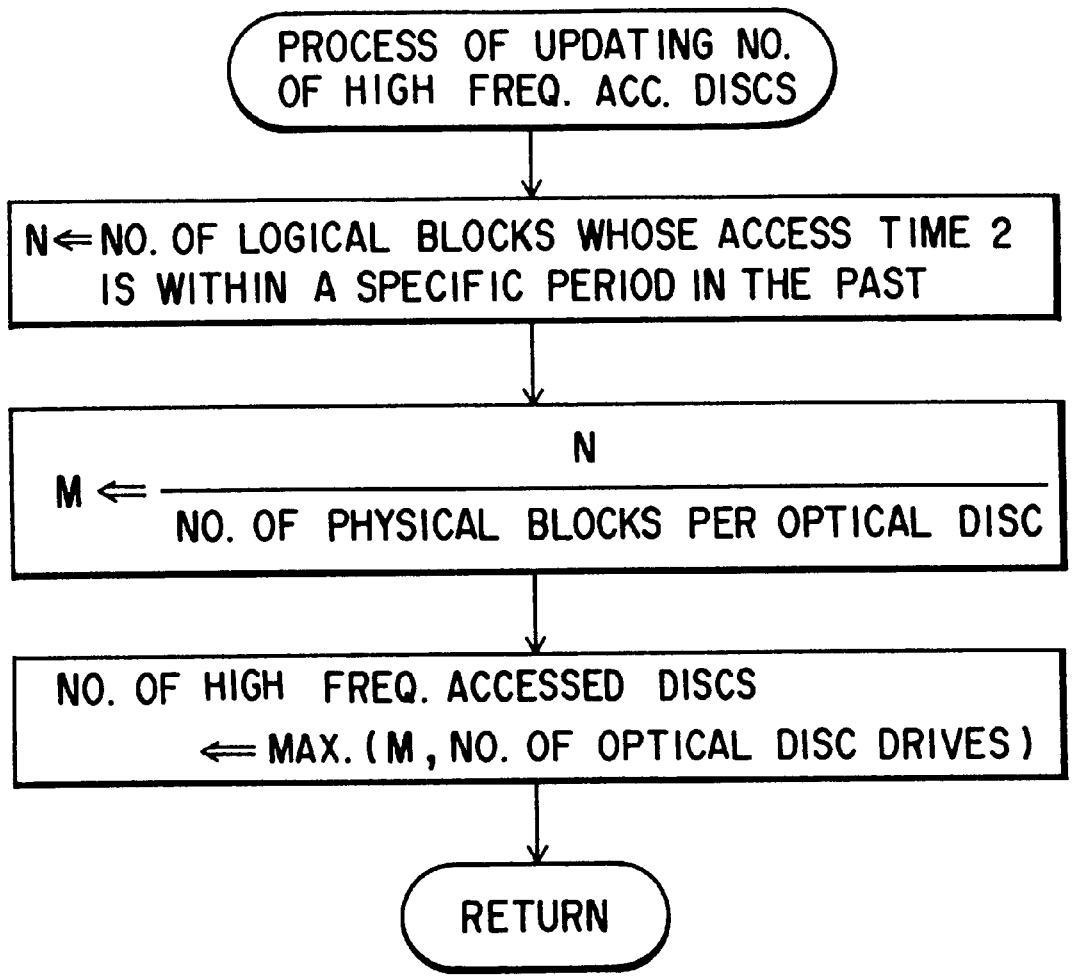
FIG. 25 is a flowchart to explain the process of updating the number of highly-frequency accessed discs.

When the command is "UPDATE OF NUMBER OF HIGH-FREQUENCY ACCESSED DISCS", a "NUMBER OF HIGH-FREQUENCY ACCESSED DISCS UPDATE PROCESS" is performed where the optimum number of highly-frequency accessed optical discs is calculated from the access history of logical blocks and the number of highly-frequency accessed discs is updated (FIG. 25).

When the command is "OTHER OPERATION MANAGEMENT", an "OTHER OPERATION MANAGEMENT PROCESS" is performed.

When the command is "END", the data in each management table 31 in the memory is saved in the HDD 3, the optical discs 24 loaded in the respective disc drives 22a through 22d are returned to the storage cells 21a through 21l and the process is terminated.

FIG. 15 is a flowchart of "LOGICAL BLOCK READING PROCESS (LBN)".

Figure 17:
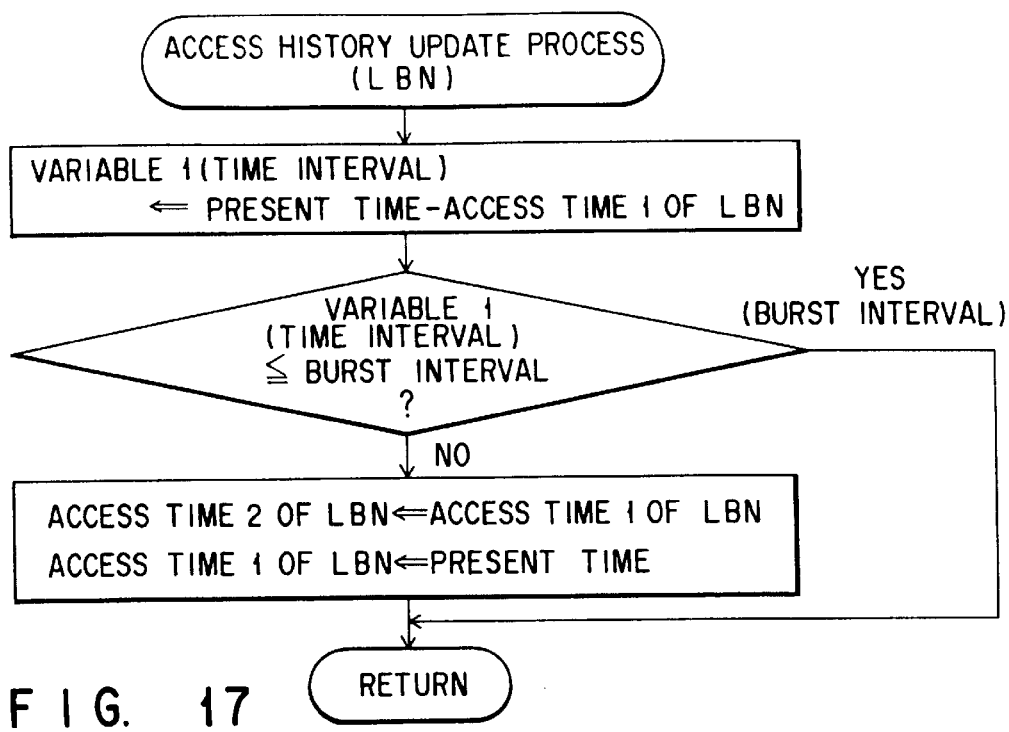
FIG. 17 is a flowchart to explain the access history update process.

First, "ACCESS HISTORY UPDATE PROCESS" is performed where the access history of logical blocks (LBN: logical block No.) is updated (FIG. 17).

Then, the cache memory block management table 35 is searched to check to see if the specified logical block exists in the cache memory 4. If it exists, the logical block data in the cache memory 4 is transmitted by the communication control section 9 to an external unit, and control returns.

When the specified logical block does not exist in the cache memory 4, a "CACHE MEMORY BLOCK SECURING PROCESS" is performed where an empty block is secured in the cache memory 4 (FIGS. 19 and 20), thereby obtaining a cache memory block (CBN).

Then, the cache HDD block management table 36 is searched to check to see if the specified logical block exists in the cache HDD 5. If it exists, the data is read from the cache HDD block (HBN) in the cache HDD 5 and stored in the cache memory block (CBN). If it does not exist in the cache HDD 5, an "OPTICAL DISC READING PROCESS" is performed where the logical block (LBN) is read from the optical disc 24 and stored in the cache memory block (CBN).

Thereafter, "CLEAN" is set in "BLOCK FLAG" corresponding to the cache memory block (CBN) in the cache memory block management table 35, and LBN is set in "LOGICAL BLOCK NO.". Then, the logical block data in the cache memory 4 is transmitted by the communication control section 9 to an external unit, and control returns.

FIG. 16 is a flowchart of "LOGICAL BLOCK WRITING PROCESS (LBN)".

An "ACCESS HISTORY UPDATE PROCESS" is performed where the access history of logical blocks (LBN: logical block No.) is updated (FIG. 17). Then, a check is made to see if the specified logical block exists in the cache memory 4. If it exists, the data is written in the cache block (CBN). If it does not exist, a "CACHE MEMORY BLOCK SECURING PROCESS" is performed (FIGS. 19 and 20), and data is written into the secured cache memory block (CBN).

Thereafter, "DIRTY" is set in "BLOCK FLAG" corresponding to the cache memory block (CBN) in the cache memory block management table 35, and LBN is set in "LOGICAL BLOCK NO.". Then, control returns.

FIG. 17 is a flowchart of "ACCESS HISTORY UPDATE PROCESS (LBN)".

First, ACCESS TIME 1 corresponding to the logical block (LBN) in the logical block management table 32 is subtracted from the present time, and the result is stored in a variable (variable 1: specific time interval). When variable 1 is less than the burst interval, the access is considered to have been made intensively, and the history is not updated. When variable 1 is larger than the burst interval, the value of ACCESS TIME 1 is set for ACCESS TIME 2, and the present time is set for ACCESS TIME 1, Then, control returns.—In the apparatus, the burst interval is set at 60 seconds. That is, even if how many times access is made in 60 seconds, it is treated as a single access.

Figure 18:
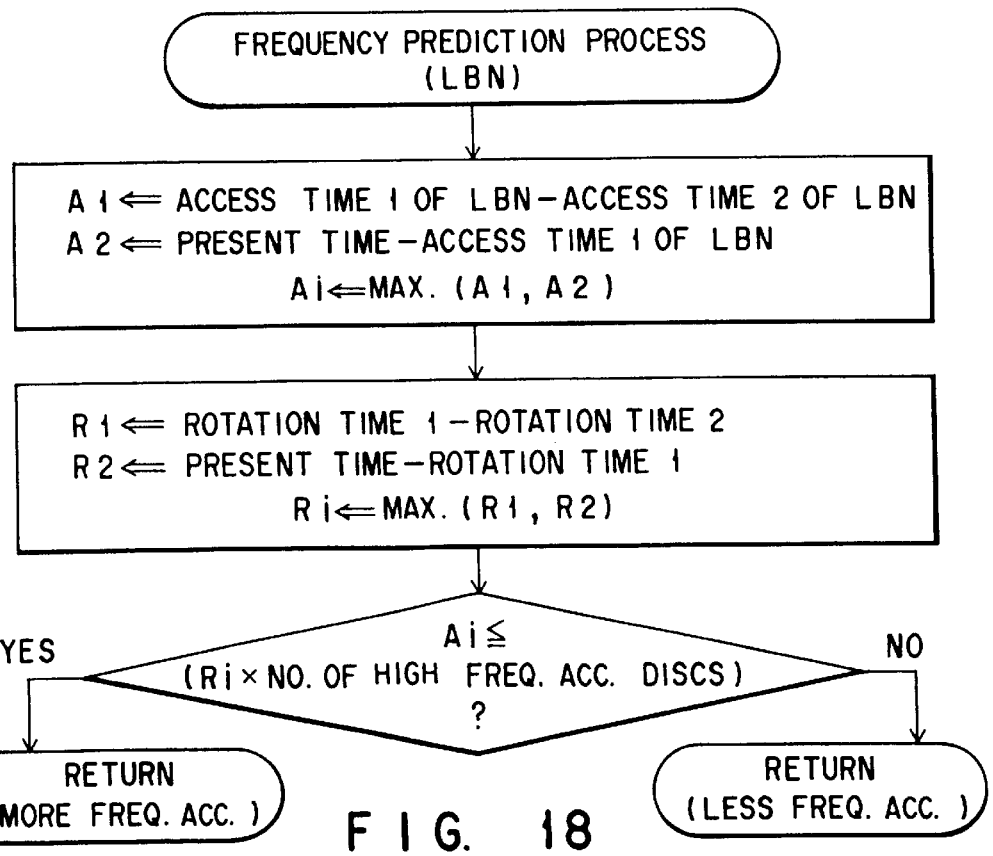
FIG. 18 is a flowchart to explain the frequency prediction process.

FIG. 18 is a flowchart of "FREQUENCY PREDICTION PROCESS (LBN)".

As shown in FIG. 3, the access interval Ai for logical blocks (LBN) and the rotation interval Ri for optical discs 24 are obtained.

When access interval Ai is less than the rotation interval, high frequency is predicted. when the access interval is larger than the rotation interval, low access frequency is predicted and control returns.

Figure 19:
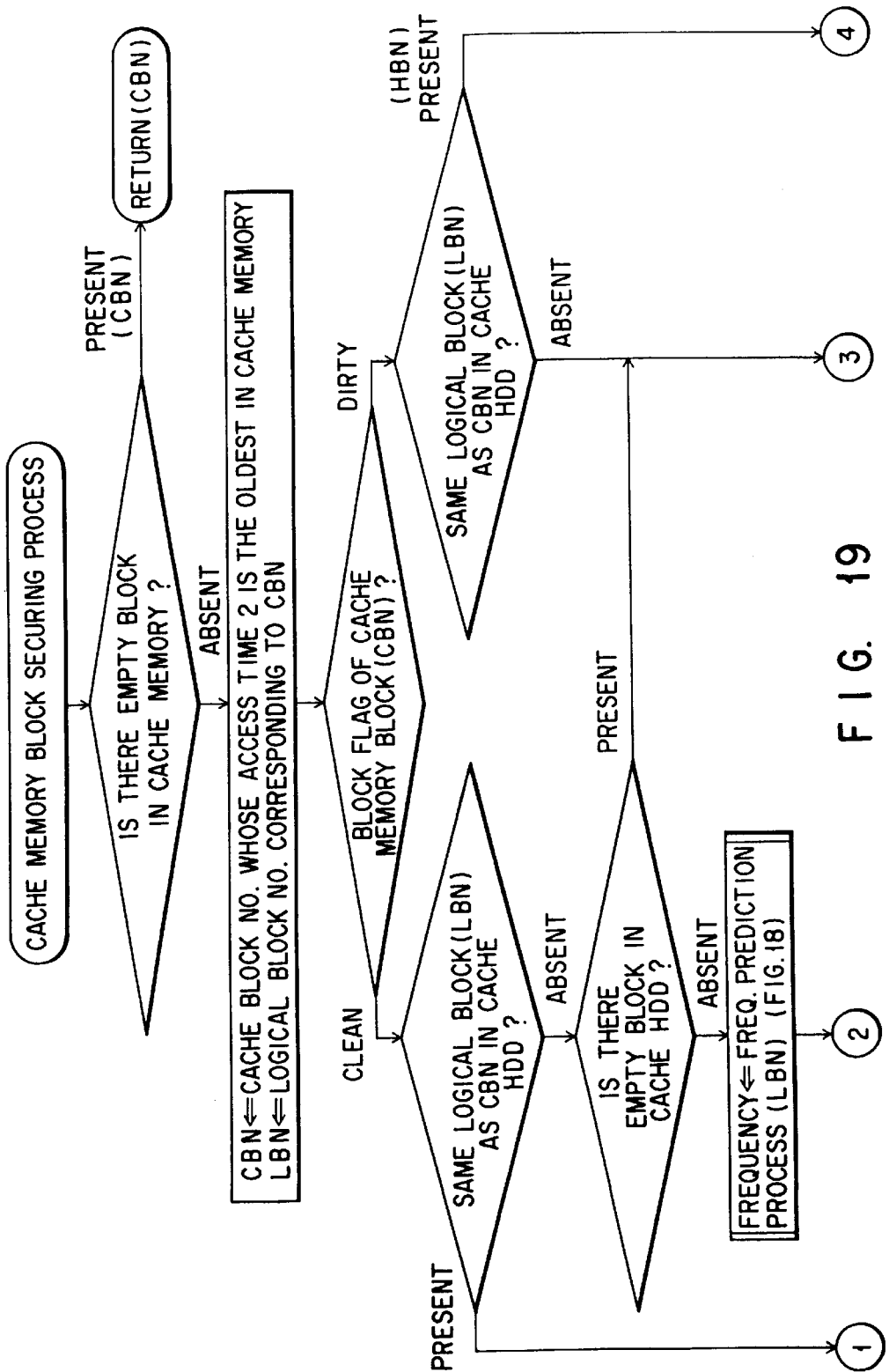
FIG. 19 is a flowchart to explain the cache memory block securing process.
Figure 20:
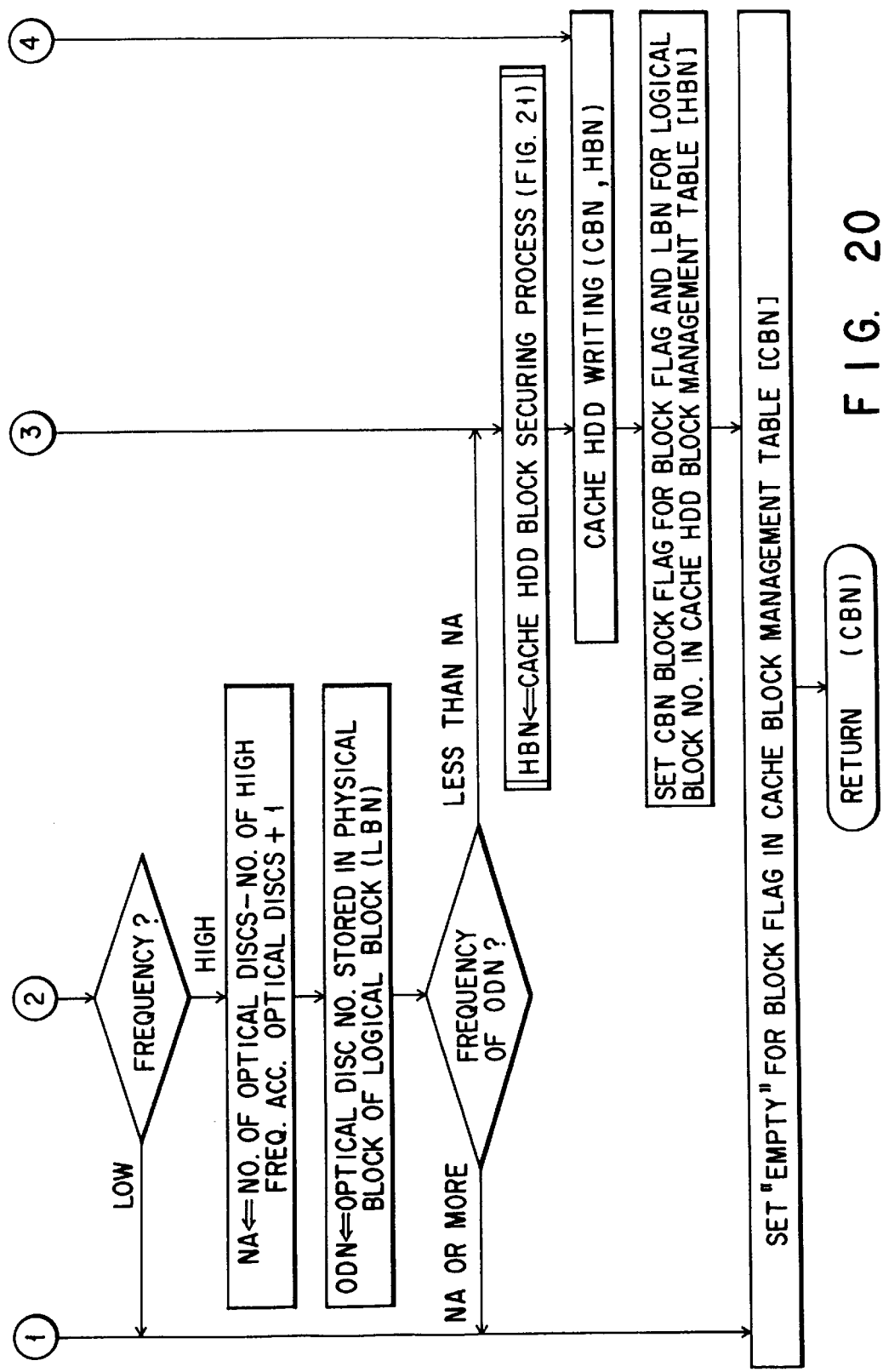
FIG. 20 is a flowchart to explain the cache memory block securing process.

FIGS. 19 and 20 are flowcharts of "CACHE MEMORY BLOCK SECURING PROCESS".

First, a check is made to see if there is an empty block in the cache memory 4. If it is present, the cache memory block (CBN) is returned.

If there is no empty block, the cache memory block (CBN) that holds the oldest ACCESS TIME 2 for logical block is selected from the cache memory 4, and it is determined to be the cache memory block to be driven out.

The cache memory block (CBN) is checked for its block flag. If it is set for "DIRTY" (the data has been changed), data is staged out to the cache HDD 5. In staging out data to the cache HDD 5, a check is made to see if the cache HDD 5 contains the cache HDD block (HBN) that stores the same logical block as that stored in the cache block (CBN). If it does, data is written into the cache HDD block (HBN). If it does not contain, a "CACHE HDD BLOCK SECURING PROCESS" is performed to secure an additional cache HDD block(FIG. 21), and data is written in the secured cache HDD block (HBN).

After data has been written into the cache HDD 5, the block flag of the cache memory block (CBN) is set for the block flag corresponding to the cache HDD block (HBN) of the cache HDD block management table 36, and the logical block No. stored in the cache memory block (CBN) is set for the logical block No. Then, "EMPTY" is set for the block flag corresponding to the cache memory block (CBN) of the cache memory block management table 35. Thereafter, control returns.

When the block flag of the cache memory block (CBN) is "CLEAN", a check is made to see if the cache HDD 5 contains the same logical block as the cache memory block (CBN). If the same logical block exists in the cache HDD 5, the block flag of the cache memory block (CBN) is set for "EMPTY", and control returns.

If the same logical block does not exist in the cache HDD 5, a check is made to see if the cache HDD 5 contains an empty block. If it contains an empty block, the cache memory block (CBN) is written into an empty block in the cache HDD 5. Then, the block flag of the cache memory block (CBN) is set for "EMPTY", and control returns.

If there is no empty block in the cache HDD 5, a "FREQUENCY PREDICTION PROCESS" to predict the access frequency of logical blocks (LBN) is performed(FIG. 18). When it is predicted that the frequency will be high, a check is made to see if the physical block corresponding to a logical block (LBN) is placed on a high frequently accessed optical disc 24. If it is not placed, the cache memory block (CBN) is written into the cache HDD 5, and the block flag of the cache memory block (CBN) is set for "EMPTY". Then, control returns.

When it is predicted that the frequency will be low or when a physical block has been placed on a high frequently accessed optical disc 24, the block flag of the cache memory block (CBN) is set for "EMPTY". Then, control returns.

Figure 21:
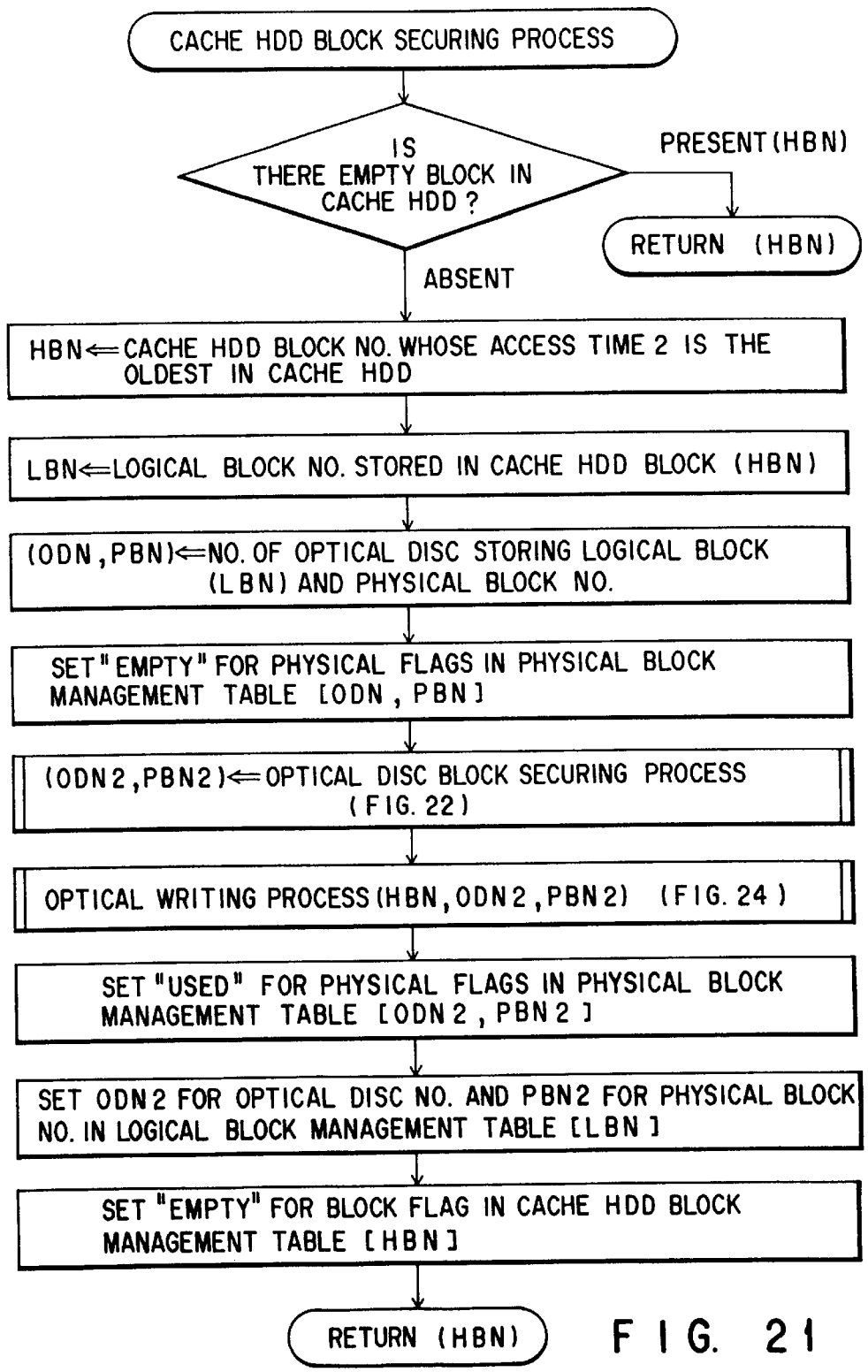
FIG. 21 is a flowchart to explain the cache HDD block securing process.

FIG. 21 is a flowchart of "CACHE HDD BLOCK SECURING PROCESS".

First, a check is made to see if there is an empty block in the cache HDD 5. If an empty block is present, the cache HDD block (HBN) is returned. If there is no empty block, the corresponding logical block (LBN) whose ACCESS TIME 2 is the oldest is selected from the cache HDD block (HBN) in the cache HDD 5. Then, an optical disc (ODN) in which the physical block for a logical block (LBN), and a physical block (PBN) are obtained. Thereafter, "EMPTY" is set in the corresponding physical flag in the physical block management table 34.

Figure 24:
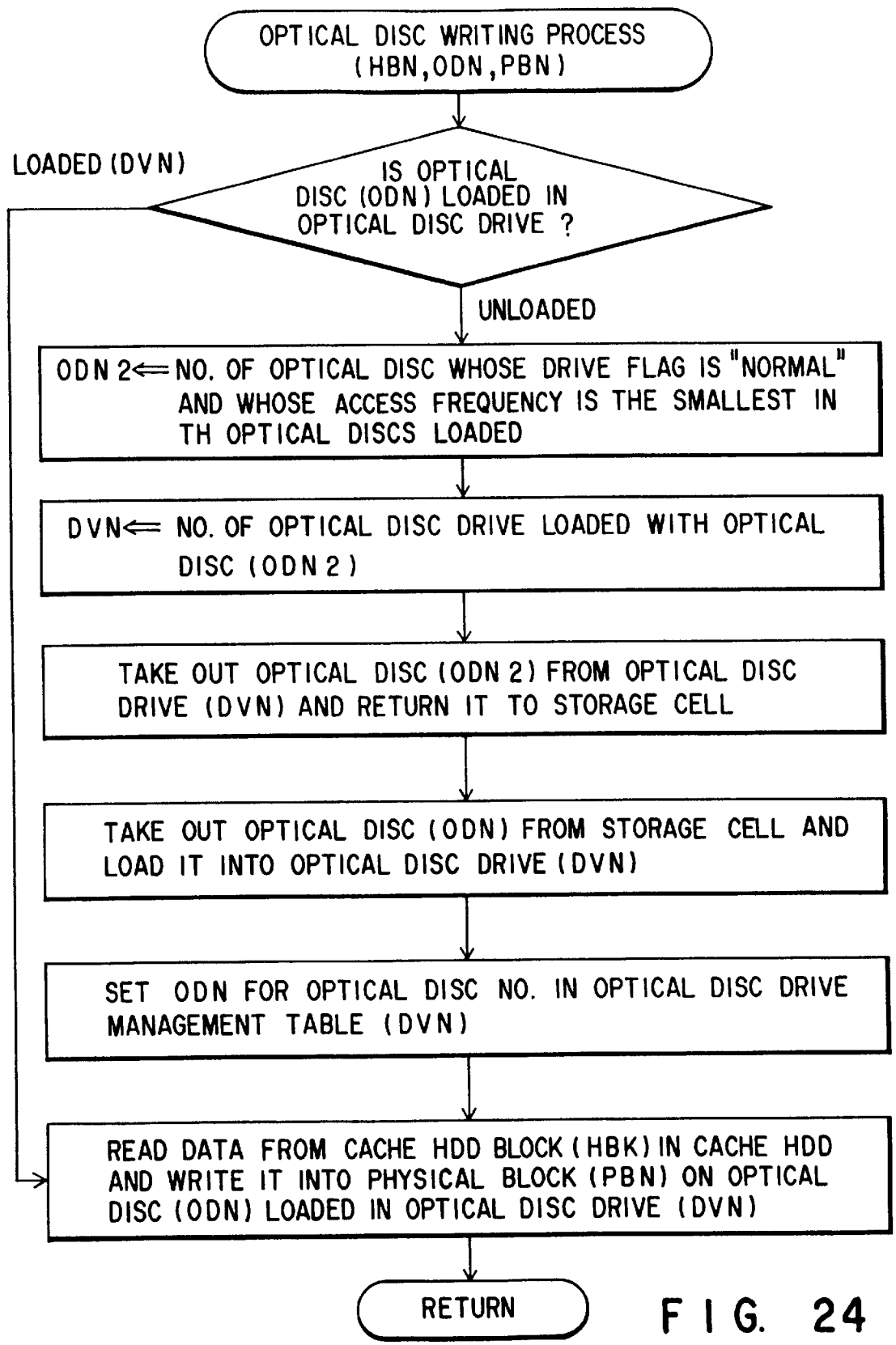
FIG. 24 is a flowchart to explain the optical disc writing process.

Then, an "OPTICAL DISC BLOCK SECURING PROCESS" is performed where an empty block is secured in an optical disc 24 (FIG. 22) to obtain the optical disc (ODN2) and the physical block (PBN2). Then, an "OPTICAL DISC WRITING PROCESS" is performed where the data in the cache HDD block (HBN) is written into the physical block (FIG. 24).

Next, "USED" is set in the physical flag corresponding to the physical block (PBN2) newly written in the physical block management table 34, ODN2 is set for the optical disc No. corresponding to the logical block (LBN) in the logical block management table 32, and PBN2 is set for physical block No. Finally, "EMPTY" is set in the block flag corresponding to the cache HDD block (HBN) in the cache HDD block management table 36. Then, control returns.

FIG. 22 is a flowchart of "OPTICAL DISC BLOCK SECURING PROCESS".

Figure 23:
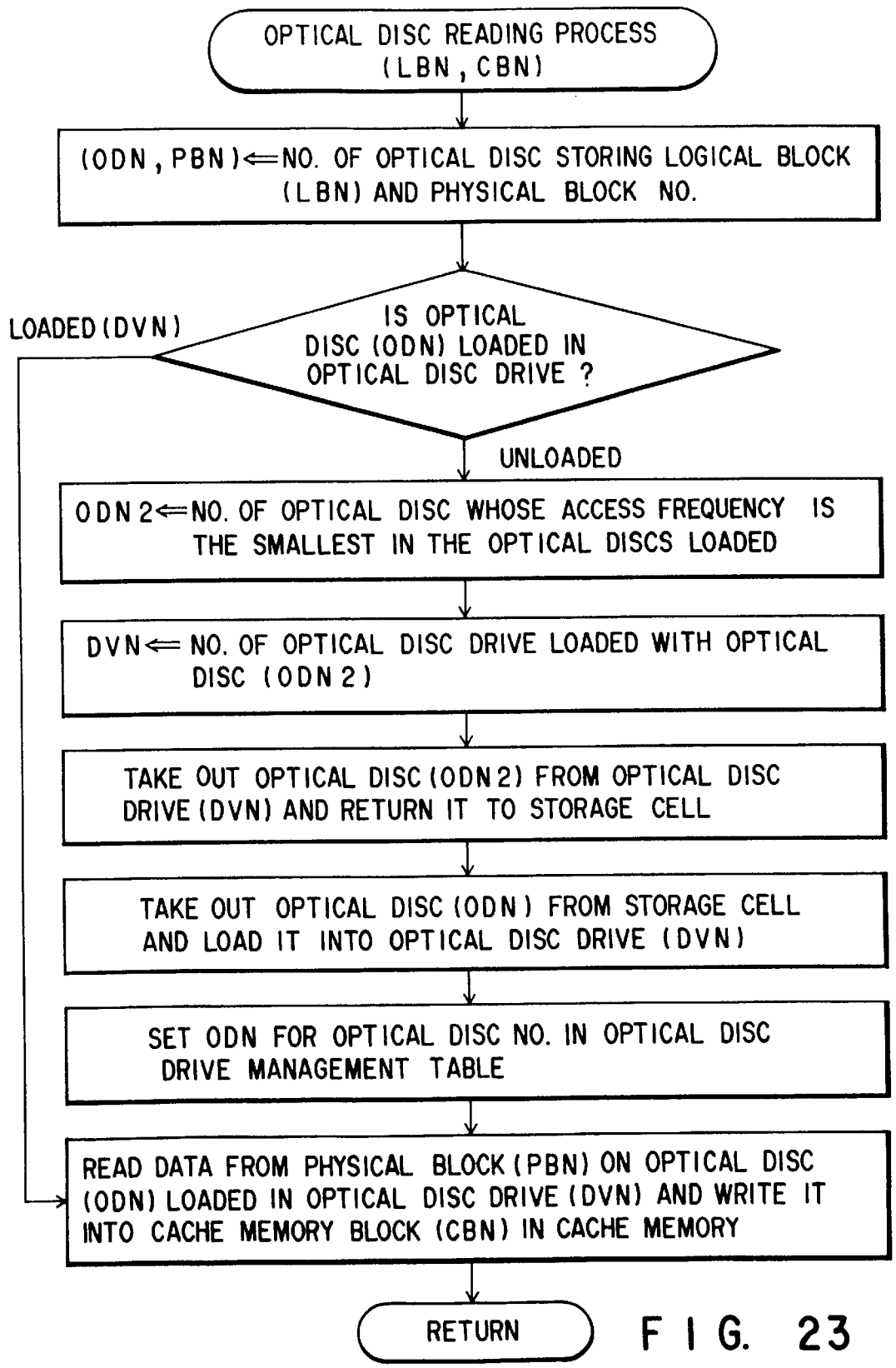
FIG. 23 is a flowchart to explain the optical disc reading process.

A check is made to see if there is an empty block in a high frequently accessed optical disc 24. If an empty block is present, its optical disc No. (ODN) and its physical block No. (PBN) are returned. If there is no empty block, empty blocks are put together in low frequently accessed optical disc 24 to produce an empty disc. Then, a "ROTATION PROCESS" is performed where the empty disc is turned into a high frequently accessed optical disc 24. Next, the high frequently accessed optical disc 24 is searched for an empty block, and its optical disc No. (ODN) and its physical block No. (PBN) are returned. FIG. 23 is a flowchart of "OPTICAL DISC READING PROCESS (LBN, CBN)."

The logical block management table 32 is searched to obtain the optical disc (ODN) in which a logical block (LBN) is stored, and a physical block (PBN). Then, a check is made to see if the optical disc (ODN) 24 is loaded in an optical disc drive. If it is loaded, data is read from the physical block (PBN) on the optical disc (ODN) 24 in the optical disc drive (DVN), and is stored in the cache memory block (CBN). Thereafter, control returns.

When it is not loaded, the optical disc (ODN2) 24 whose access frequency is the smallest is selected from the optical discs loaded. The selected optical disc 24 is removed from the optical disc drive (DVN) and returned into a storage cell. Then, an optical disc 24 (ODN) is taken out of a storage cell and loaded into the optical disc drive (DVN), and ODN is set for the optical No. corresponding to the optical disc drive (DVN) in the optical disc drive management table 38.

Finally, data is read from the optical disc (ODN) physical block (PBN) in the optical disc drive (DVN), and stored in the cache memory block (CBN). Then, control returns.

FIG. 24 is a flowchart of "OPTICAL DISC WRITING PROCESS (HBN, ODN, PBN)".

A check is made to see if the optical disc 24 (ODN) is loaded into the optical disc drive 22a. If it is loaded, the data in the cache HDD block (HBN) is written into the physical block (PBN) in the optical disc 24 (ODN) in the optical disc drive (DVN) 22a. Then, control returns. If it is not loaded, the optical disc 24 whose access frequency is the smallest is selected from the optical discs 24 loaded. The selected optical disc 24 is removed from the optical disc drive (DVN), and is returned to the storage cell 21a.

Then, the optical disc 24 (ODN) is removed from the storage cell 21a, and loaded into the optical disc drive (DVN) 22a. Thereafter, ODN is set for the optical disc number corresponding to the optical disc 24 (DVN) in the optical disc drive management table 38. Finally, the data in the cache HDD block (HBN) is written into the physical block (PBN) in the optical disc 24 in the optical disc drive (DVN) 22a. Then, control returns.

FIG. 25 is a flowchart of "PROCESS OF CHANGING THE NUMBER OF HIGHLY-FREQUENCY ACCESSED DISCS (VARIABLE 2)".

The logical block management table 32 is searched to obtain the number (N) of logical blocks whose ACCESS TIME 2 is within the period of the past (variable 2). Then, the largest one of the value obtained by dividing N by the number of physical blocks per optical disc and the number of optical disc drives is set as the updated number of highly-frequency accessed discs. Then, control returns.

While in the CACHE MEMORY BLOCK SECURING PROCESS (FIGS. 19 and 20) and the CACHE HDD BLOCK SECURING PROCESS (FIG. 21), a delete mark is put on the area on the old optical disc 24 to turn the area into an empty area in staging out data from the cache HDD 5 to the optical disc 24, a delete mark may be put on the area on the old optical disc 24 in staging out data from the cache memory 4 to the cache HDD 5. By doing this, an empty area can be secured on the optical disc 24 in the early stages, and both of the cache HDD 5 and the high frequently accessed optical discs 24 can be accessed effectively.

As described above, by predicting the access frequency of data from the access history, allocating frequently accessed data to a highly-frequency accessed optical disc, and allocating data to the cache HDD and a highly-frequency accessed optical disc more likely to be loaded in an optical drive without overlapping, the number of changes of optical discs can be reduced, thereby improving the performance of the apparatus.

Furthermore, by obtaining the amount of data actually accessed with high-frequency from the data access history, and keeping the number of highly-frequency accessed optical discs at the optimal value, even when variations in the pattern of accessing the apparatus occur, the variation can be followed, thereby suppressing the deterioration of the performance.

In staging out data from the cache HDD to a highly-frequency accessed optical disc, by putting a delete mark on the area on the old optical disc, an empty area can be secured in the optical disc at an earlier stage. This can raise a possibility that highly-frequency accessed data will exist in the cache HDD or a highly-frequency accessed optical disc.

Furthermore, for example, if the number of optical discs is 50, the number of optical disc drives is 2, and all highly-frequency accessed data items go in five optical discs (referred to as the number of high-frequency accessed discs), because in the present invention, access to optical discs concentrates on the five optical discs, the probability that an optical disc to be accessed will be loaded in a drive is 2/5=0.4. While in the conventional system, the probability was 2/50=0.04. Therefore, it is possible to reduce the number of disc changes remarkably.

As explained above, it is possible to provide an assembled-type optical disc apparatus which reduces the number of disc changes, improving the performance, which, when the access pattern changes, can follow the changes, suppressing the deterioration of the performance, and which can secure an empty area on an optical disc at an earlier stage, thereby raising the probability that the data to be accessed will exist in the cache HDD or a high-frequency accessed optical disc.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claim and its equivalents.

What is claimed is:

1. A data access apparatus comprising:

a plurality of storage cells to keep a plurality of highly frequently accessed optical storage media to store more frequently accessed data and less frequently accessed media to store less frequently accessed data;

at least one optical disc drive to have one of the plurality of optical storage media loaded therein and to write and to read data into and from the loaded optical storage media;

an accessor to load one of the optical storage media kept in one of the storage cells into one of the at least one optical disc drive or to remove the one of the storage media loaded in the one of the at least one optical disc drive and returning the one of the at least one optical disc drive to the one of the storage cell;

a cache memory to store cache data for the optical media;

a cache HDD to store modified data outputted from the cache memory or data having an access frequency larger than a specified value and not being stored in one of the highly frequently accessed optical storage media; and a number of highly frequently accessed disc update section to obtain an amount of data actually frequently accessed from a data access history and for computing a number of highly frequently accessed optical storage media on the basis of an amount of data and for setting the number of the highly frequently accessed optical storage media at the number of frequently accessed optical storage media computed by the disc update section.

2. A data access apparatus comprising:

keeping means for keeping a plurality of less frequently accessed optical storage media storing less frequently accessed data and highly frequently accessed optical storage media storing highly frequently accessed data;

driving means for having one of the plurality of optical storage media loaded therein and writing and reading data into and from the loaded optical storage medium;

first processing means for loading one of the optical storage media kept in the keeping means into one of the driving means or removing the storage medium loaded in the driving means and returning it to the keeping means;

a cache memory for storing cache data for the optical storage media;

a cache storage medium for storing modified data outputted from the cache memory or data having an access frequency larger than a specified value and not being stored in one of the highly frequently accessed optical storage media; and a number of highly frequently accessed disc update means for obtaining an amount of data actually frequently accessed from a data access history and for computing a number of highly frequently accessed optical storage media on the basis of an amount of data and for setting the number of the highly frequently accessed optical storage media at the number of media computed.

* * * * *